US006940714B2

(12) United States Patent
Helot et al.

(10) Patent No.: US 6,940,714 B2
(45) Date of Patent: Sep. 6, 2005

(54) SUPPORT FOR A DISPLAY SCREEN

(75) Inventors: Jacques H Helot, Barcelona (ES); Olivier Mache, Barcelona (ES); Gilles Vromandt, Bresson (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/703,413

(22) Filed: Nov. 6, 2003

(65) Prior Publication Data

US 2004/0130859 A1 Jul. 8, 2004

(30) Foreign Application Priority Data

Nov. 14, 2002 (EP) .............................. 02354176

(51) Int. Cl.[7] .............................................. G06F 1/16
(52) U.S. Cl. .................... 361/683; 361/681; 248/223.1; D14/314
(58) Field of Search .............................. 361/681–683, 361/727–735; 248/223.1, 223.2, 223.3; D14/314, 333–337

(56) References Cited

U.S. PATENT DOCUMENTS

| 5,729,430 | A | | 3/1998 | Johnson ...................... 361/682 |
|---|---|---|---|---|
| 5,815,369 | A | * | 9/1998 | Quesada ...................... 361/686 |
| 5,822,181 | A | * | 10/1998 | Jung .......................... 361/683 |
| 5,909,357 | A | * | 6/1999 | Orr ............................ 361/687 |
| 6,050,849 | A | * | 4/2000 | Chang ........................ 439/536 |
| 6,081,420 | A | | 6/2000 | Kim et al. ................... 361/681 |
| 6,275,375 | B1 | * | 8/2001 | Nam .......................... 361/682 |
| 6,366,452 | B1 | * | 4/2002 | Wang et al. ................ 361/681 |
| 6,392,873 | B1 | * | 5/2002 | Honda ........................ 361/681 |
| 6,466,436 | B2 | * | 10/2002 | Faranda et al. ............. 361/685 |
| 6,563,705 | B1 | * | 5/2003 | Kuo ........................... 361/687 |
| 6,661,648 | B2 | * | 12/2003 | Dayley ....................... 361/683 |
| 6,716,047 | B2 | * | 4/2004 | Milan ......................... 439/284 |
| 6,833,988 | B2 | * | 12/2004 | Kamphuis et al. .......... 361/681 |
| 2002/0089820 | A1 | * | 7/2002 | Abboud ...................... 361/685 |
| 2003/0210333 | A1 | * | 11/2003 | Manico et al. ............. 348/220.1 |
| 2003/0231460 | A1 | * | 12/2003 | Moscovitch ................ 361/681 |
| 2004/0190238 | A1 | * | 9/2004 | Hubbard ..................... 361/683 |

* cited by examiner

Primary Examiner—Lynn Field
Assistant Examiner—Anthony Q. Edwards

(57) ABSTRACT

A support for a display screen for a computer, the support comprising a receiving part defining a bay in which a peripheral module may be removably received.

24 Claims, 10 Drawing Sheets

SUPPORT FOR A DISPLAY SCREEN

DESCRIPTION OF INVENTION

This invention relates to a support for a display screen, a module adapted to be removably received in the support and a computer system comprising a support and a module.

BACKGROUND OF THE INVENTION

As computer systems have developed, the number of component modules of the system have increased as the functionality and capabilities of personal computers have expanded. A typical personal computer system of known type is shown in FIG. 1. The system as indicated generally at 10 with a desk top shown at 11. A processor unit is shown at 12 connected to a display screen, in the present example a liquid crystal display (LCD) display 13 by an appropriate connection 14. The processor unit 12 comprises, for example, a motherboard having a CPU, memory and a data storage device such as a hard disk drive. A USB hub 15 is provided connected to the processor unit by a USB connection 16. The USB hub 15 is connected to a number of peripherals, in this example, a printer 17, a web cam 18, a mouse 19, and a keyboard 20. To provide an audio output, an appropriate audio unit 21 is provided, for example including a pair of speakers, connected to the processor unit by a pair of appropriate wires 22a, 22b for a stereo connection. The audio unit 21 also provides connections to further units, for example to a headset 23 all further connections such as a microphone. The system 11 is further linked to a power supply 24, a telephone connection 25 and a local area network 26. Five connections to the power supply 24 are required, to power supply units 27a, 27b, 27c and 27d, for the printer 17, USB hub 15, display screen 13 and audio unit 21 respectively, as well as to an internal power supply unit 12a of the processor unit 12. An appropriate cable 28 leads from the processor unit to the local area network connection 26, and a further cable 29 leads from the audio unit 21 to the telephone connection 25.

The problem of the computer system 10 arises from the number of accessories and cables and power supply units required. It is desirable that the various peripherals be accessible, and where possibly easily connectable or removable from the system 10. For aesthetic reasons and practical reasons, particularly relating to the accessibility and ergonomics of the system, it is desirable that the system 10 occupies as small an area of the desk 11 as possible, that is has a smaller footprint as possible. Thus problems arise where there is a large number of peripherals present. For ergonomics and aesthetic reasons, it is further desirable that the cables of the system 10 be as discreet and easy to handle as possible, and this is difficult when a large number of connections are required as shown.

A partial attempt to meet this problem has been provided by such methods as providing integration of some components. Thus for example, the Hewlett Packard Multimedia Monitor Base provides audio functionality including speakers and a headset connection in a stand on which a monitor can be placed. The Apple I-Mac provides an integrated processor unit and screen with an integrated hard disk drive and an optical disk drive. Similarly, the Hewlett Packard "E-PC All-In-Two" provides a computer system which has a small processor unit, a screen and a keyboard, where the screen and processor unit have a small footprint and are intended to be put on a common base to reduce visual clutter on a desk top. However, all these systems are relatively inflexible in that they may not permit easy addition or removal of or access to components. On the E-PC "All-In-Two" for example, the on/off button, USB connector and optical disk drive are hidden behind the LCD screen and so are not easily accessible. Where addition of an extra element is required, in particular for the E-PC, the extra element is not located separately to the main system, thus occupying more space and requiring at least an extra cable and possibly another power supply unit.

SUMMARY OF THE INVENTION

According to a first aspect of the invention, we provide a support for a display screen for a computer, the support comprising a receiving part defining a bay in which a peripheral module may be removably received.

The support may comprise a guide tunnel which may extend from the bay to receive a cable of a peripheral module received in the bay.

The receiving part may comprise two spaced forwardly extending side parts connected by a rear part, wherein the forwardly extending parts and the rear part define the bay.

The guide tunnel may be provided in the rear part.

The receiving part may comprise an engagement part to support the peripheral module.

A power input connector may be provided to provide power to the display screen, the power input connectable being connectable to a power output connector of a peripheral module received in the bay.

The support may comprise an upwardly extending element with a display screen connection part to engage a display screen at an upper part thereof.

The receiving part may comprise a base part of the support.

When a module is received in the bay, at least a part of the front of the module and the upper part of the module may be accessible to a user.

The module may be introduced into the bay by a generally horizontal movement from a front part of the receiving means.

According to a second aspect of the invention, we provide a module adapted to be removably received in a support according to the first aspect of the invention.

The module may comprise a power supply unit, a power input and a power output connector connectable to a power input connector of the support.

Where the support comprises a guide tunnel, the module may comprise a power supply unit holder to receive the power supply unit, the power supply unit being receivable in the guide tunnel.

At least part of the module may be receivable in the guide tunnel.

The module may be adapted to co-operate with one or more additional modules.

The module may be adapted to co-operate with one or more modules in a vertically stacked configuration.

The module may comprise one or more connectors whereby at least one additional module may be operatively connected thereto.

The module may comprise a compartment to receive at least one further module.

The at least one further module may comprise a data storage device.

The module may comprise a USB hub with a USB connection for connection to a processor unit.

The module may comprise a data storage device.

The module may be connectable to at least one of a camera, a headset, one or more speakers, a mouse, a keyboard, a printer and a network. The speakers may alternatively be integrally provided as part of the module.

According to a third aspect of the invention, we provide a computer system comprising a processor unit, a display comprising a display screen and a support according to the first aspect of the invention and a module according to the second aspect of the invention.

The module may be received in the bay of the support.

According to a fourth aspect of the invention, we provide a computer system comprising a display comprising a display screen and a support for a display screen where the support comprises a receiving part defining a bay in which a peripheral module may be removably received, a main peripheral module received in the bay and at least one further module connected to the main peripheral module, wherein the main module is connected to the processing unit by a USB connection and wherein the processing unit is connected to the display screen by a video information connection.

BRIEF DESCRIPTION OF THE DRAWINGS

A plurality of embodiments of the present invention will now be described by way of example only with reference to the accompanying drawings, wherein;

FIG. 8a is an illustration of a larger scale of part of the support and module of FIG. 8.

DESCRIPTION OF THE PREFERRED EMBODIMENTS

In the following description, the terms "forward" and "forwardly" are used to indicate a part of the invention which faces a user when the invention is in use or a direction towards the user, and the terms "rear" and "rearwardly" are used to indicate a part of the invention which faces away from a user, or a direction away from a user and are used here purely for illustrative reasons without implying any limitation.

Figure 2:
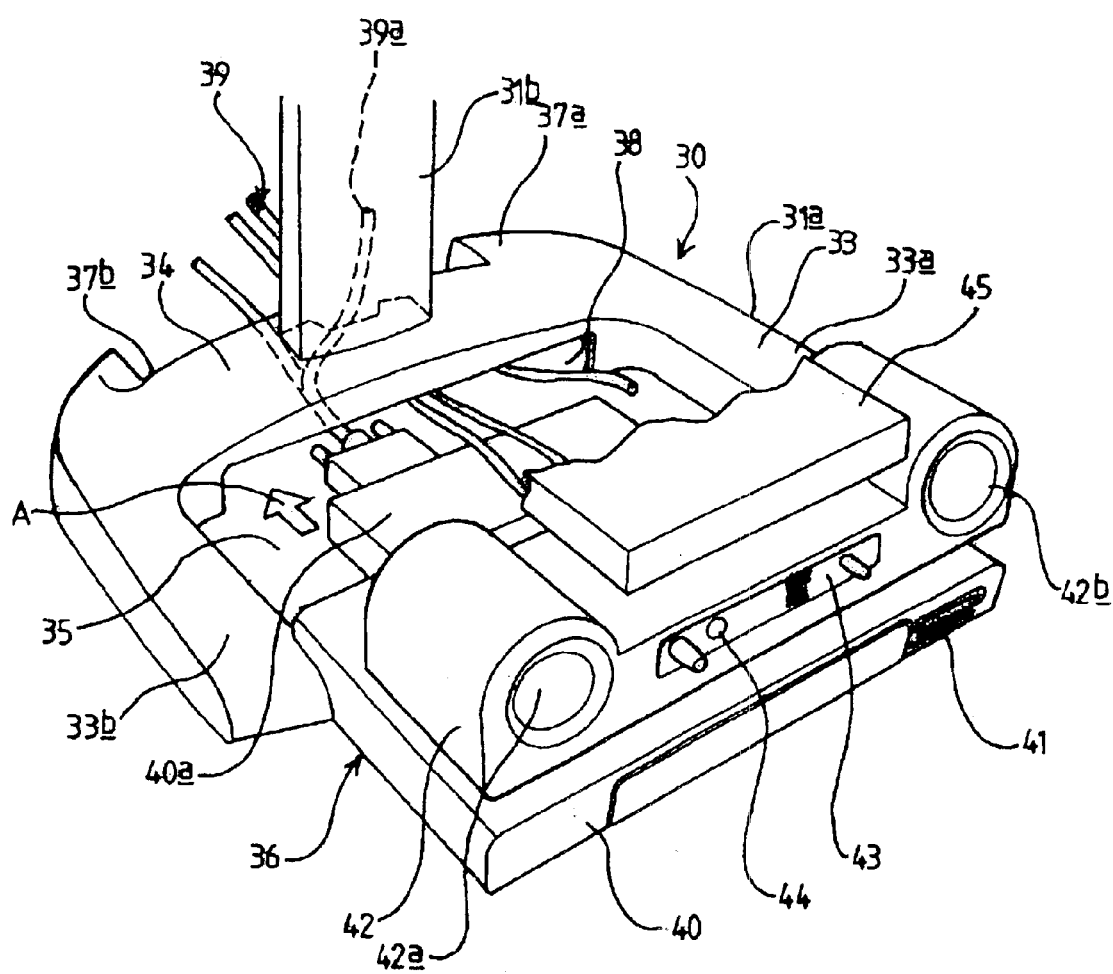
FIG. 2 is a perspective view of a support and plurality of modules embodying the present invention.
Figure 2A:
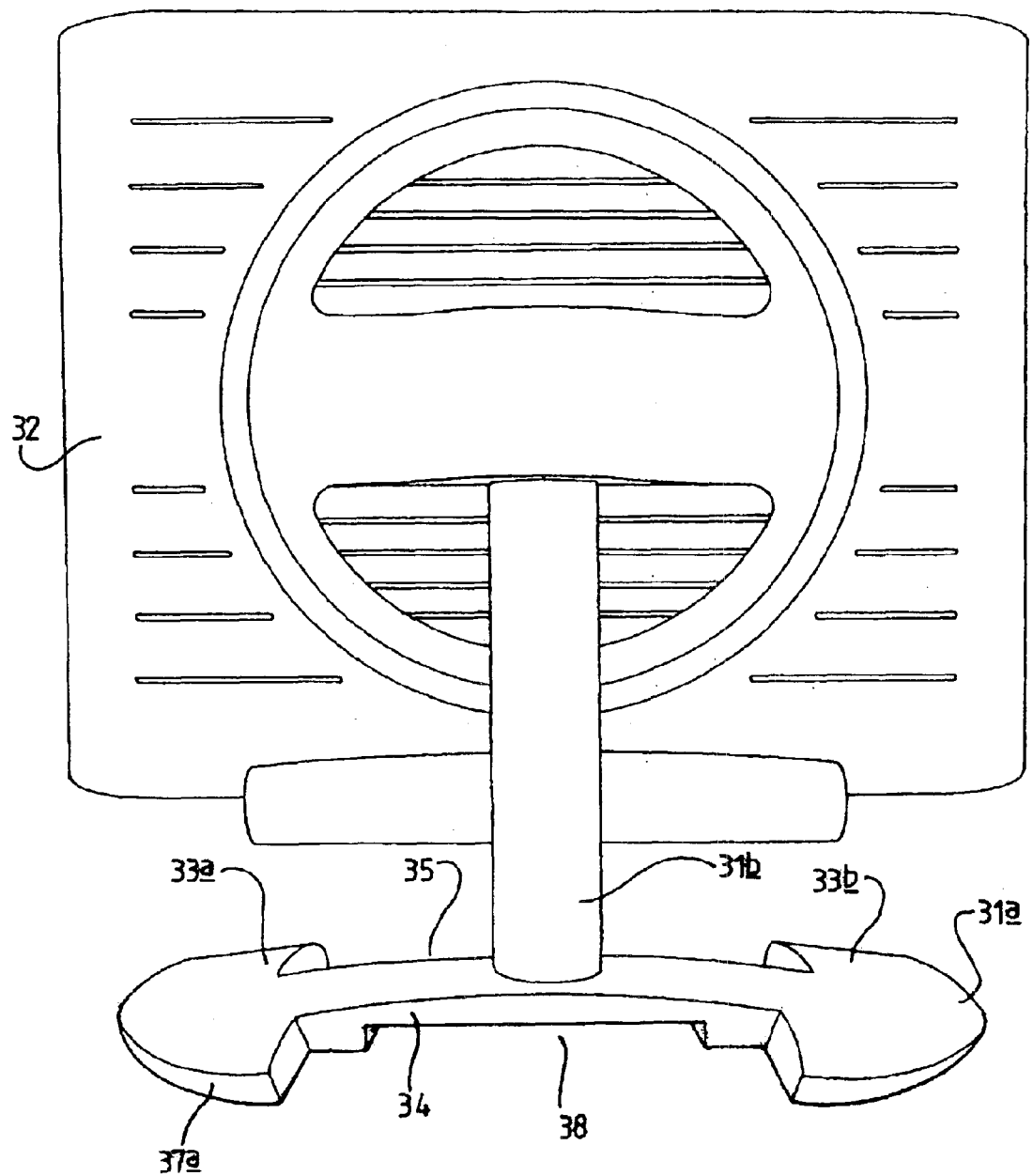
FIG. 2a is a rear view of the support of FIG. 2.

Referring to FIGS. 2 and 2a, a support embodying the present invention is generally indicated at 30. The support 30 comprises a base part 31a and an upwardly extending part 31b which provides a column for connection to a display screen 32, in the present example a liquid crystal display screen. The base part 31 comprises a receiving part generally indicated at 33 comprising a pair of spaced generally parallel forwardly extending arms 33a, 33b connected by a rear part 34. The arms 33a, 33b and rear part 34 define a bay 35 in which one or more modules, here generally shown at 36 may be received. In this example, the base part 31 is further provided with a pair of rearwardly extending limbs 37a, 37b which extend rearwardly of the rear part 34 to provide additional stability. It will be apparent that the support 30 may be shaped as desired for aesthetic and ergonomic reasons.

The receiving part 33 is further provided with a guide 38 leading from the bay 35 to receive cables, here generally illustrated at 39 connected to the modules 36. In this embodiment, the guide 38 comprises a guide tunnel defined in the rear part 34 and extending from the bay 35 in a direction rearwardly of the support 30, passing under the upwardly extending part 31b.

In this example, the receiving part 33 is largely provided by the base part 31a, such that the forwardly extending arms 33a, 33b provides stability to the support 30 as well as defining the bay 35. However, it will be apparent that the support may be configured whereby the base part 31a which provides stability to the support 30 is physically distinct from the receiving part 31b.

By providing the receiving part 33 in the base part 31a in manner that sufficient clearance between the top of the modules 36 and the LCD screen 32 is provided to permit the LCD display screen 32 to be rotated between landscape and portrait orientations.

Referring now to the modules 36, the lowermost of the modules in this example comprises a data storage device, in this case a optical disk drive 40 although the data storage device may comprise a hard disk drive or any other data storage and/or retrieval device as required. The optical disk drive ("ODD") 40 is adapted to be received in the bay 35. In particular, the optical disk drive 40 is adapted to be shaped such that it is snugly received between the forwardly extending arms 33a, 33b but may be easily slid therein and is inserted by a horizontal rearward sliding motion in the direction indicated by the arrow A. A rear part 40a of the optical disk drive and the guide 38 are suitably adapted such that the rear part 40a is received in the guide 38, in the present example under the upwardly extending part 31b. In this manner, the overall footprint of the support 30 may be minimised.

The ODD 40 may have other functions, for example providing an on/off button 41 for the computer and may also function as, for example, an E-PC interface module.

The modules 36 may comprise further modules, in this example an audio module 42 having speakers 42a, 42b controls 43 and a connection socket 44 for a headset. The audio module 42 is adapted to be located on top of the ODD module 40 and to be received between the forwardly extending arms 33a, 33b. Again, in this example, a further module is provided, in this example a USB hub 45 adapted to be located on top of the audio module 42 and to be received in the space between speakers 42a, 42b. It will be apparent that the cables 39 of the modules 40, 42, 45 extend through the guide 38 in a rearward direction and/or may extend up through the upwardly extending part 31*b* as indicated in broken outline at 39*a* where appropriate. The modules 40, 42, 45 may be designed to have a complementary exterior appearance as well as co-operate physically in a vertically stacked configuration as shown.

Figure 1:
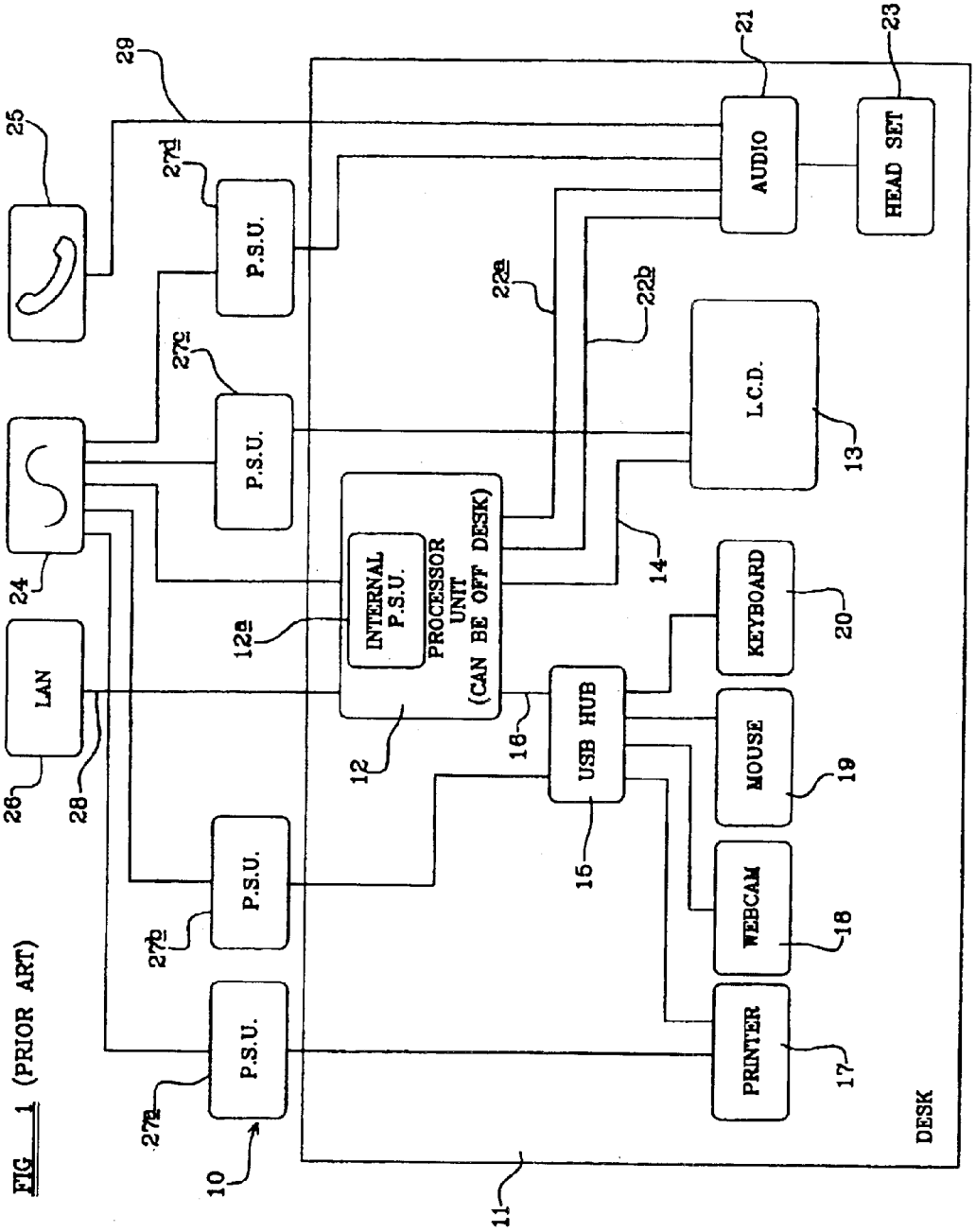
FIG. 1 is a diagrammatic illustration of a known computer system.
Figure 3:
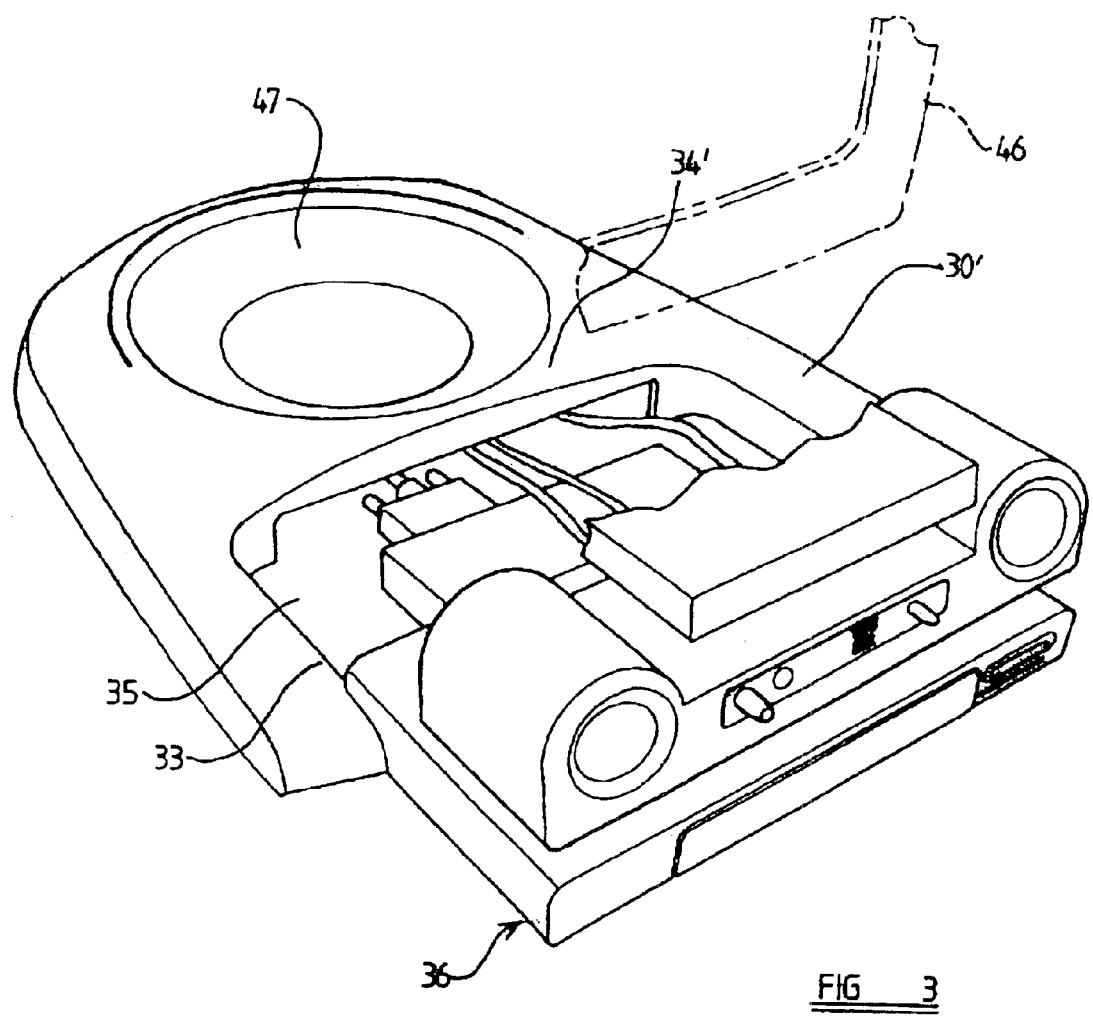
FIG. 3 is a perspective view of a support and modules similar to that of FIG. 2.
Figure 4:
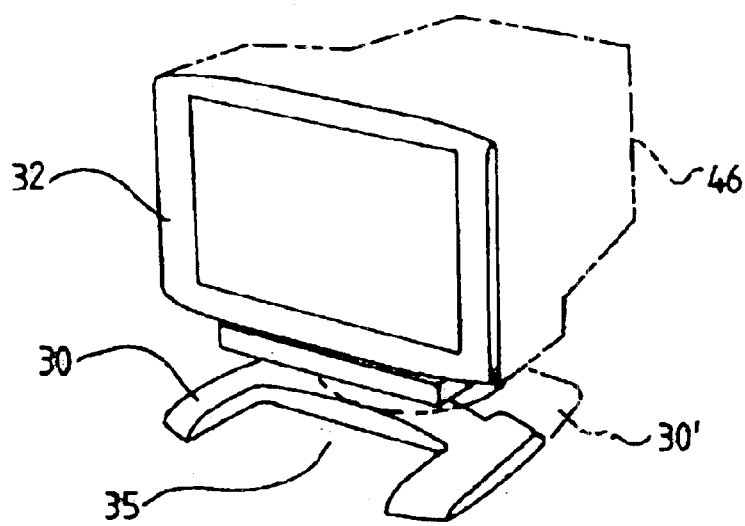
FIG. 4 is a perspective view of the supports of FIG. 2 and FIG. 3.

In FIG. 3, a support 30' is shown which is similar to the support 30 of FIG. 1 but is instead adapted for a cathode ray tube (CRT) display generally indicated at 46. The receiving part 33 is dimensioned similarly to that of FIG. 2. However, to provide the necessary stability for a CRT display 46, the rear part 34' is wider and deeper. The support 30' is further provided with a connection part 47 to engage a CRT display 46 as appropriate. As shown in FIG. 4, the relative dimensions of the supports 30, 30' for a LCD display 32 or an CRT display 46 are shown. It will be apparent that the receiving part 33 and the bay 35 have the same dimension in each case.

Figure 5A:
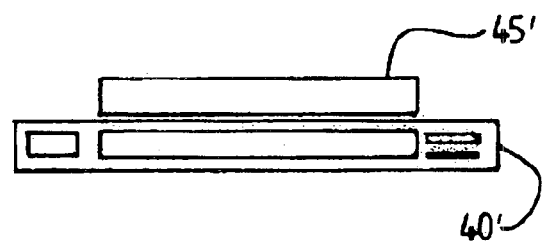
FIG. 5a is a front view of an alternative configuration of the modules in FIGS. 2 and 3.
Figure 5B:
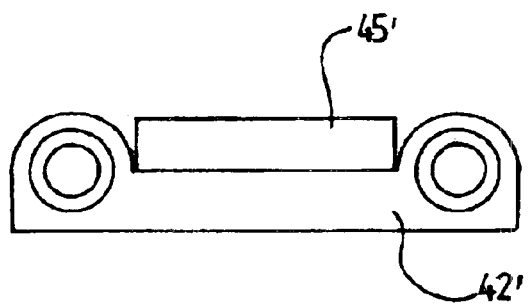
FIG. 5b is a front view of a further alternative configurations of the modules of FIGS. 2 and 3.
Figure 5C:
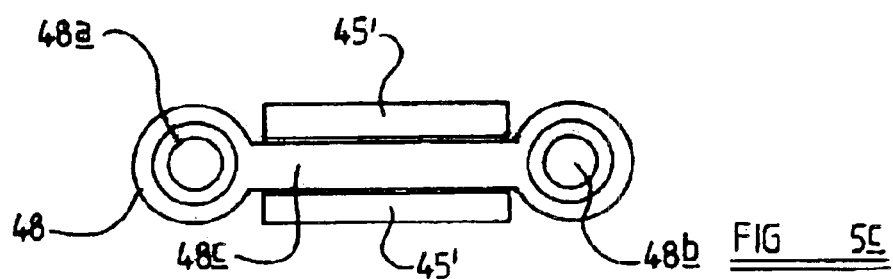
FIG. 5c is a front view of a still further embodiment of the modules of FIGS. 2 and 3.
Figure 6:
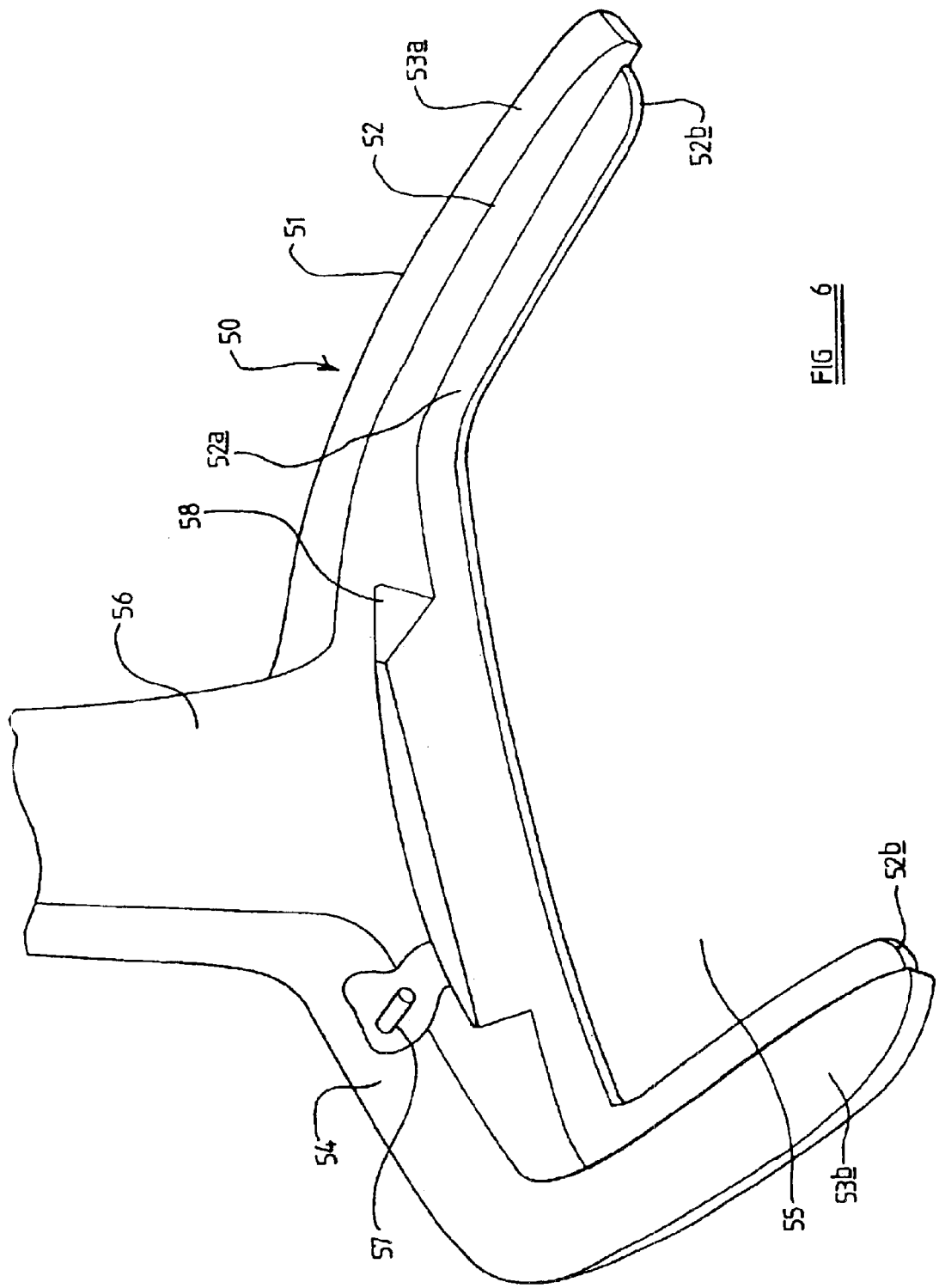
FIG. 6 is a perspective view of a further support embodying the present invention.

It will be apparent that the modules 36 may be arranged as desired and not necessarily as shown in FIGS. 2 and 3. For example, as shown in FIGS. 5*a* and 5*b* modules 40' and 45' having the same dimension as of the ODD 40 and USD hub 45 may be provided to co-operate in a vertically stacked configuration, or indeed as shown in FIG. 5*b*, modules 42' and 45' having the same configuration as audio module 42 and USB hub module 45 may be provided. The various modules need not have the same external configuration as those already shown; for example, in FIG. 5*c* a module 48 is shown comprising speakers 48*a*, 48*b* connected by a body part 48*c* where the speakers 48*a*, 48*b* and body part 48*c* define spaces above and below the body part 48*c* in which modules 45' having the same external configuration as the USB hub module 45 may be located.

Although in the embodiments of FIGS. 2 to 5*c*, the modules are physically co-operating but not electrically or otherwise functionally interconnected, it will be apparent that by functionally interconnecting modules where appropriate, fewer cable will be required extending from the processor unit to the modules.

It will further be apparent that where no modules are provided, the support 30 may be used simply as a support for a display, as for example in the system of FIG. 1.

Another embodiment of the invention will now be described with reference to FIGS. 6 to 10. A support is shown at 50 comprising a base part 51 having a receiving part 52. The receiving part 52 comprises a pair of spaced forwardly extending arms 53*a*, 53*b* interconnected by a rear part 54. The forwardly extending arms 53*a*, 53*b* and rear part 54 define a bay 55 in like manner to the embodiment of FIGS. 2 and 3 to receive a module 66. An upwardly extending part 56 is provided in this example to provide a support for a connection means for a LCD display screen. It will be apparent that the support 50 might be adapted to provide a support for a CRT display as in the example of FIG. 3. The receiving part 52 in this example is provided with a engagement part 52*a* in this example a flange extending inwardly of the bay 55 and extending around the forwardly extending arms 53*a*, 53*b* and the rear part 54. The engagement part 52*a* provides additional mechanical stiffness to the base part 51 and also helps support the module 66 when the support 50 is lifted when the module 66 is located in the bay 55. The forward edges 52*b* of the engagement part 52*a* help align the module 66 on insertion into the bay 55. It will be apparent that such an engagement part might be provided in the support 30 of FIGS. 2 and 3, and also may be of any appropriate shape as desired to engage a module received in the receiving part.

Figure 7:
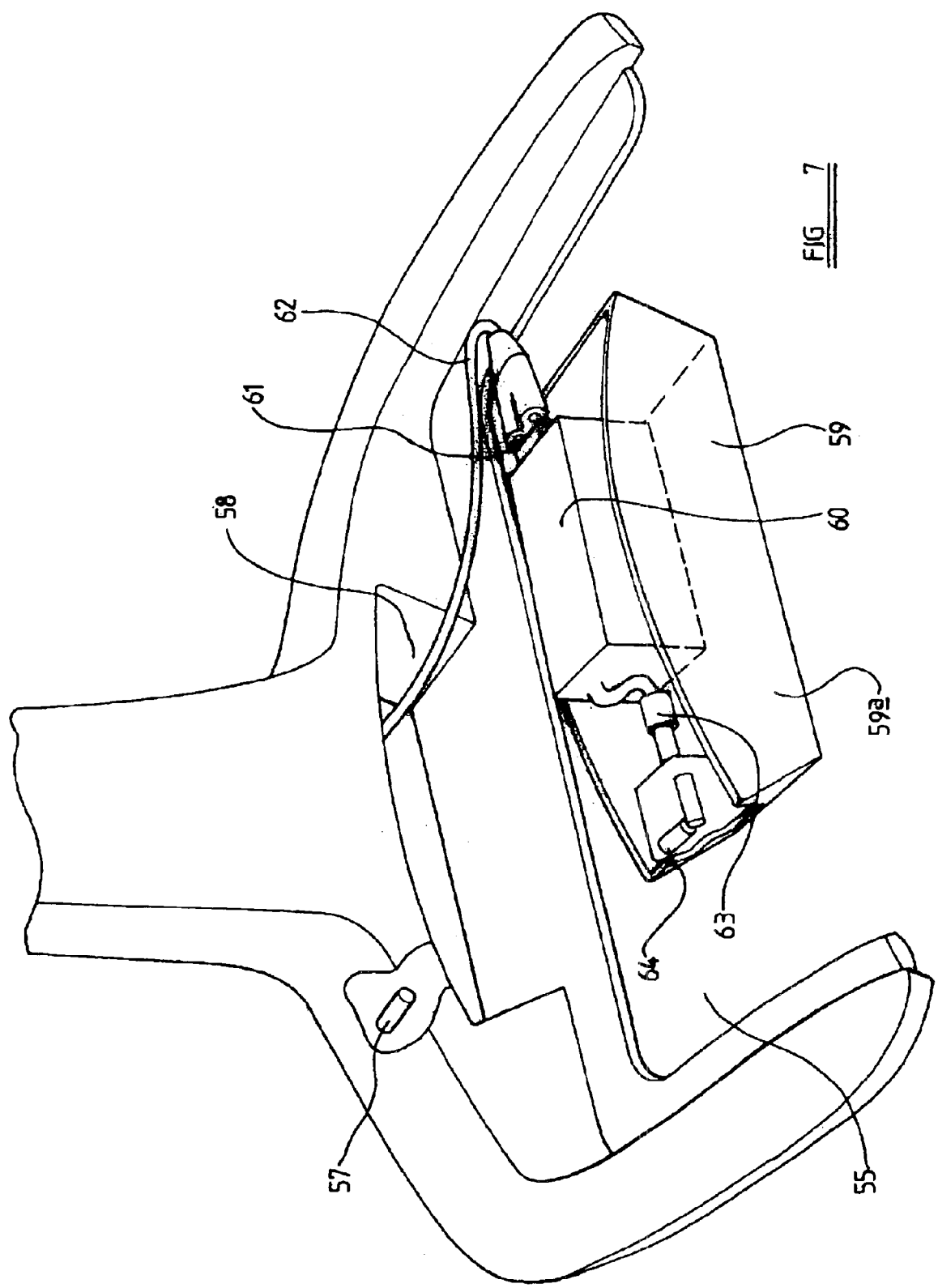
FIG. 7 is a further perspective view of the support of FIG. 6.

The support 50 is provided with a power input connector 57 to provide DC power for the LCD display screen via a lead 57*a*. The rear part 54 in this example is provided with a guide comprising a tunnel 58 extending rearwardly of the bay 55, and a power input connection 57 is located within the tunnel.

Where no module is provided within the receiving means 52, a power supply unit 59 may be provided adapted to be received within the guide 58. As shown in FIG. 7, the power supply module 59 comprises a power supply unit holder 59*a* which houses a standard power supply unit at 60 provided with a power input connection 61 for connection with an alternating current power input lead 62. The power supply unit 60 has a DC output 63 which is connected to a power output connector 64. When the power supply module 59 is located in the guide 58, the power output connector 64 engages the power input connector 57 to supply power to the display.

Figure 8:
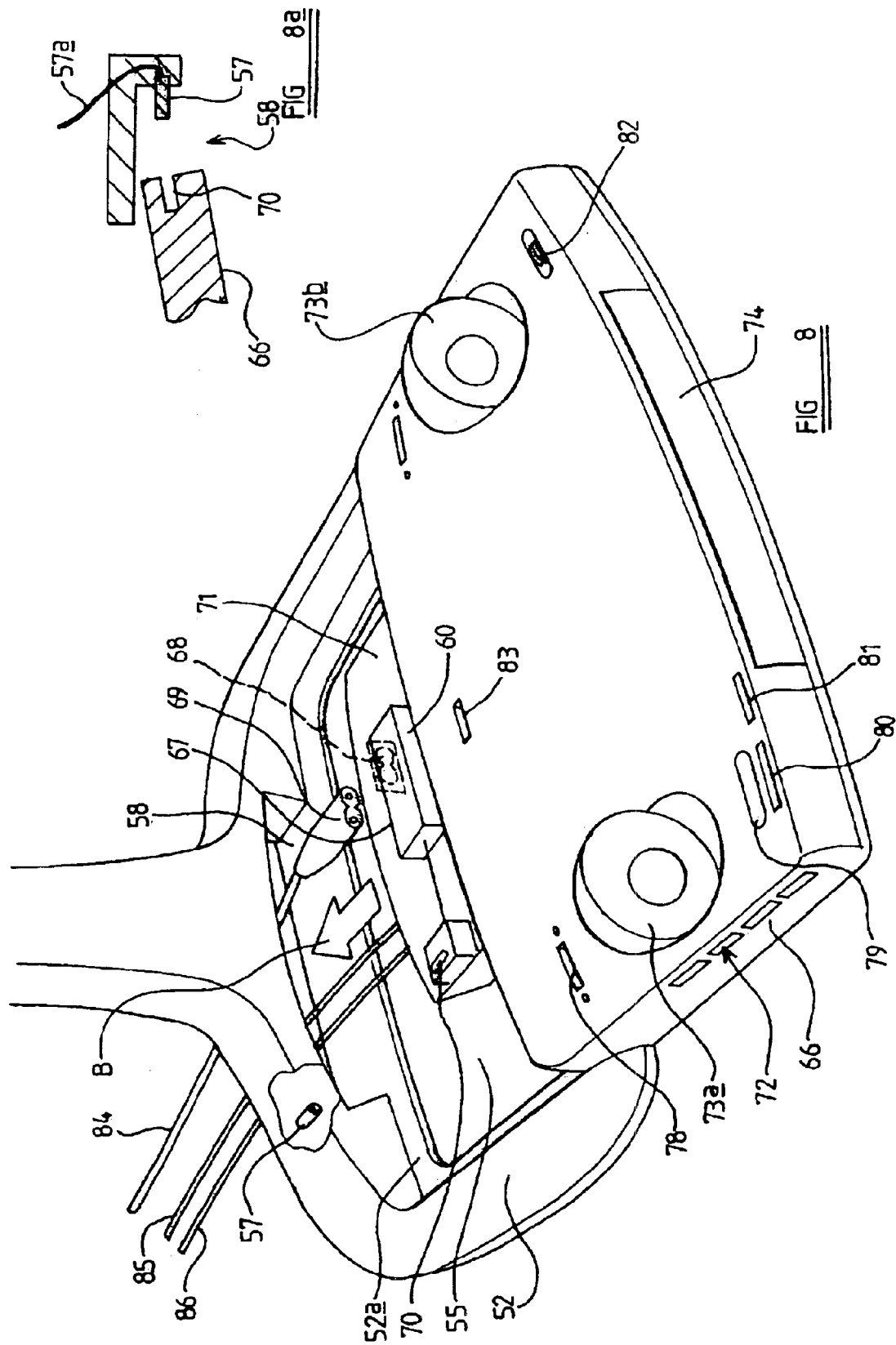
FIG. 8 is a perspective partially cut away view of the support of FIG. 6 provided with a module.

Referring to FIGS. 8 and 8*a*, a removable module is shown at 66 which may be removably received in the bay 55 of the receiving means 52. In like manner to the power supply module 59, the module 66 is provided with a power supply unit 67 and a power connection 68 for connection to an alternating current mains lead 69. The module 66 is provided with a power output connector 70. The power supply unit 69 is located in a rearward compartment 71 of the module 66 which is adapted to be received in the guide 58 and the power output connector 70 is disposed to engage the power input connector 57 in like manner to the power input connector 64 of the power supply module 59. The power input connector 57 and power output connector 70 are disposed to be engaged by movement of the module 66 in a rearwards direction as shown by arrow B. by providing a power supply in this manner, both a display screen and a module can make use of a common power supply unit, reducing the number of power supply units required by the computer and reducing the need for cables, thus reducing the number of PSUs and/or cables present on the floor or desktop. It will be apparent that such a power supply unit might be provided as part of the group of modules 36 of FIGS. 2 and 3.

Figure 9:
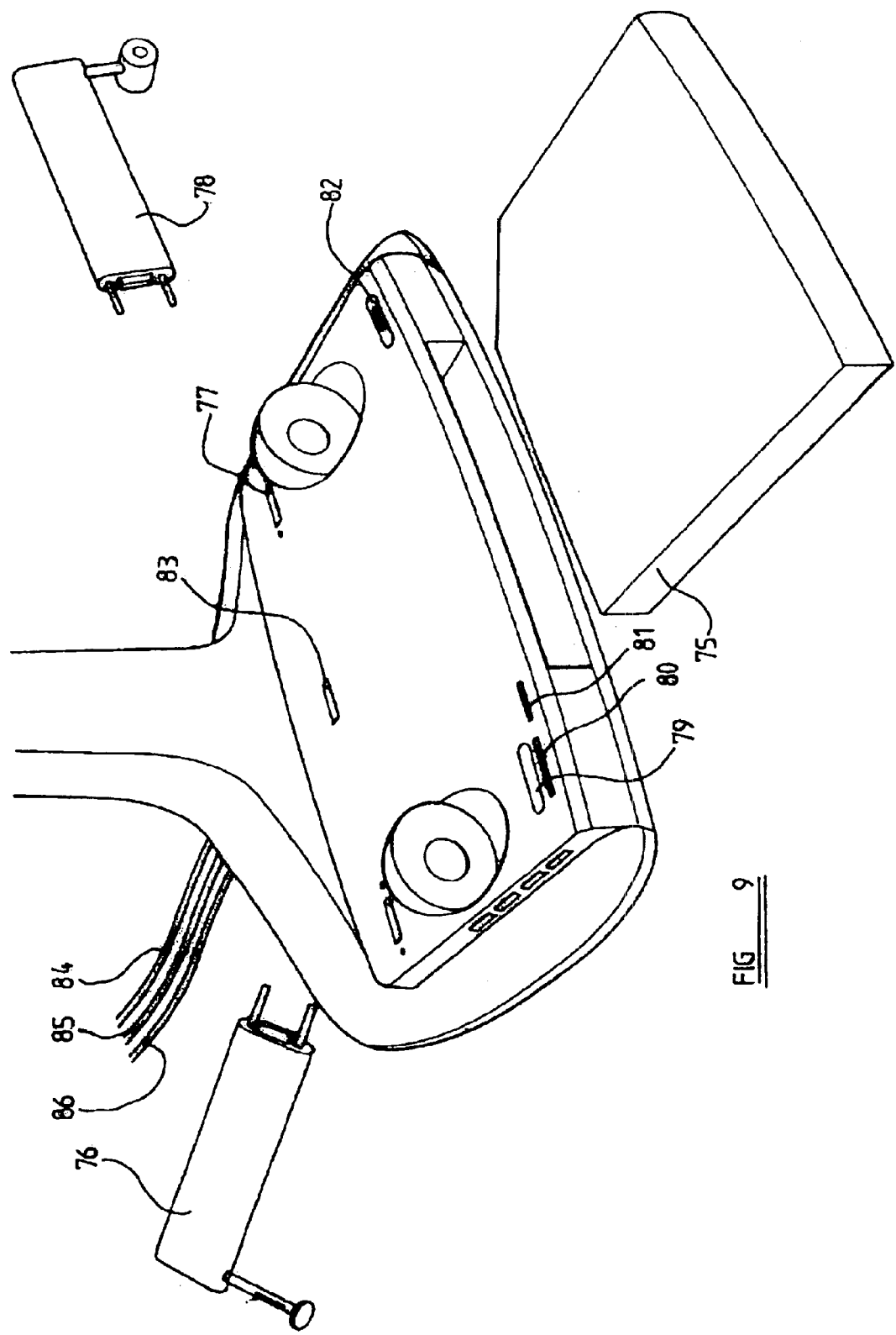
FIG. 9 is a perspective view of the support and module of FIG. 8.

Although the modules of FIGS. 2 and 3 each had a single function or limited number of functions, it will be apparent that a module may be provided with multiple functions. As shown in FIGS. 8 and 9, that the module 66 comprises a central module which performs a plurality of functions, such as providing an audio telephone connection, a USB hub and a wireless connection module, such as Bluetooth, and also accommodates a removable data storage device. As shown in FIGS. 8 and 9, the module 66 for example comprises a plurality of USB connections 72, speakers 73*a* and 73*b*, and a slot 74 for a removable data storage drive 75, for example an optical disk drive such as a DVD, CD-ROM, CD-RW floppy drive, hard disk drive, tape drive or any other drive as appropriate. In this example, the module 66 is also provided with other connections, for example a connector 75 for a headset holder and recharger module 76 and a connector 77 for a web-cam 78. Other functions, in this example an on/off button 79, an on/off LED 80, a hard disk drive function LED 81 and a volume control 82, are provided. To permit additional modules to be connected to the module 66, an appropriate connector 83 is provided. In this example, the module 66 has three cables, a power connection 84, a phone line connection 85 and a combined USB and VGA connection 86.

The central module 66 may of course be placed anywhere on the desktop as desired by the user, and need not be engaged with the support 50.

Figure 10:
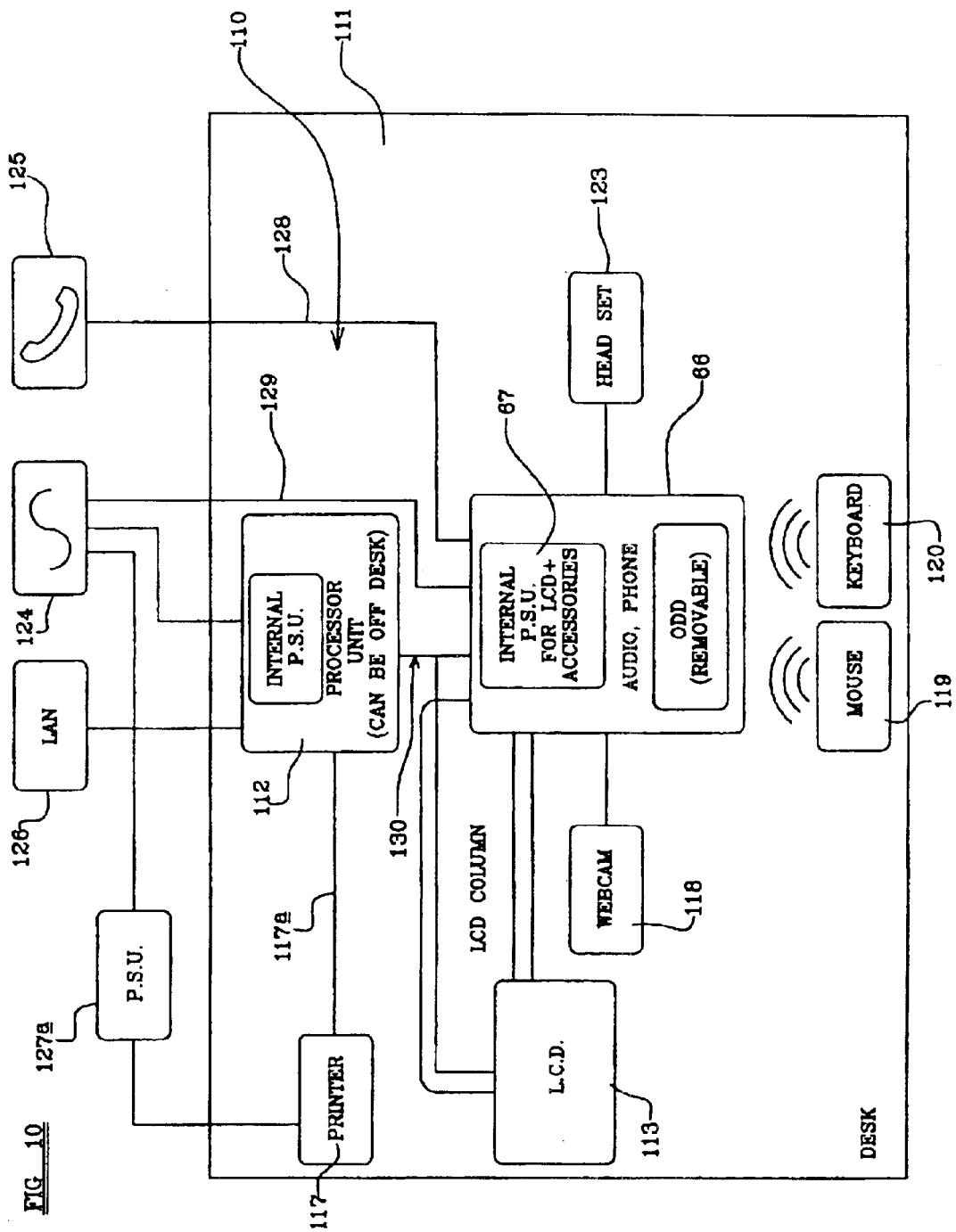
FIG. 10 is a diagrammatic illustration of a computer system provided with a support and modules embodying the present invention.

A diagrammatic illustration of a computer system including such a support and module is shown at 110 in FIG. 10 provided on a desk top 111. A processor unit 112 is provided together with an LCD display 113. The system is similarly provided with a printer 117, web-cam 118, mouse 119, keyboard 120 and a headset 123. A power supply unit 127a is provided for the printer 117 and a USB connection 117a extends between the processor unit 112 and the printer 117. The system 110 is similarly provided with connections to a local area network 126 to a power supply 124 and a telephone connection 125.

In this example, a module 66 as shown in FIGS. 8 and 9 is provided. The module 66 is provided with a cable 128 linked to the telephone connection 125, a power cable 129 and a combined VGA and USB cable 130 connected to the processor unit 112. Because the module 66 provides audio, phone, USB and wireless connection capabilities, the web cam 118 and headset 123 are connected to the module 66, and the mouse 119 and keyboard 120 comprise in this example a wireless keyboard and mouse which communicate with the module 66, in a wireless connection and wherein mouse movements and clicks and key presses are transmitted on the USB connection 130 to the processor unit 112. The LCD display screen 113 draws its power from the common internal power supply unit 67. As will be apparent from the system of FIGS. 1 and 10, the requirements for both the number of power supply units and for the number of cables for management are substantially reduced. Further, by providing the module 66 such that it is removably received in the support 50, the functionality is provided in a tidy, aesthetic and ergonomically desirable manner. The central module 66 is easily accessible to a user, thus allowing for ease of connection of peripherals and other devices, and may be easily moved or replaced by withdrawing it from the receiving part 52 and replacing it with a further module or modules as desired.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A support for a display screen for a computer, the support comprising a rearward portion having inside and outside walls and two arms having inside and outside walls extending forward from the inside wall of said rearward portion toward a first opening, the inside walls of the two arms and the rearward portion forming a bay in which a peripheral module may be removably received through the first opening, wherein a second opening extends all the way between the inside wall of one of the rearward portion and the two walls, and the outside wall of one of the rearward portion and the two walls.

2. A support according to claim 1, wherein the second opening provides for connecting a cable from the outside of the support to a peripheral module received in the bay.

3. A support according to claim 1 wherein the second opening extends all the way from the inside wall of the rearward portion and the outside wall of the rearward portion.

4. A support according to claim 1 wherein the bay comprises an engagement part to support the peripheral module.

5. A support according to claim 1 comprising a power input connector to provide power to the display screen, the power input connector being connectable to a power output connector of a peripheral module received in the bay.

6. A support according to claim 1 comprising an upwardly extending element with a display screen connection part to engage a display screen at an upper part thereof.

7. A support according to claim 1, wherein the bay comprises a base part of the support.

8. A support according to claim 1 wherein, when a module is received in the bay, at least a part of the front of the module and the upper part of the module is accessible to a user.

9. A support according to claim 1 wherein the module is introduced into the bay by a generally horizontal movement through the first opening of the support.

10. A module adapted to be removably received in a support for a display screen for a computer, said support comprising a rearward portion having inside and outside walls and two arms having inside and outside walls extending forward from the inside wall of said rearward portion toward a first opening, the inside walls of the two arms and the rearward portion forming a bay in which a peripheral module may be removably received through the first opening, wherein a second opening extends all the way between the inside wall of one of the rearward portion and the two walls, and the outside wall of one of the rearward portion and the two walls.

11. A module according to claim 10 wherein the module comprises a power supply unit, a power input and a power output connector connectable to a power input connector of the support.

12. A module according to claim 11 further comprising a power supply unit holder to receive the power supply unit, the second opening being provided to receive a cable of a peripheral module received in the bay, and the power supply unit holder.

13. A module according to claim 10, wherein the second opening is provided to receive a cable of a peripheral module received in the bay wherein at least part of the module is receivable in the cable guide.

14. A module according to claim 10 wherein the module is adapted to co-operate with one or more additional modules.

15. A module according to claim 14 wherein the module is adapted to cooperate with one or more modules in a vertically stacked configuration.

16. A module according to claim 14 wherein the module comprises one or more connectors whereby at least one additional module may be operatively connected thereto.

17. A module according to claim 14 wherein the module comprises a compartment to receive at least one further module.

18. A module according to claim 17 wherein the at least one further module comprises a data storage device.

19. A module according to claim 10 wherein the module comprises a USB hub with a USB connection for connection to a processor unit.

20. A module according to claim 10 wherein the module comprises a data storage device.

21. A module according to claim 10 wherein the module is connectable to at least one of a camera, a headset, speakers, a mouse, and a keyboard.

22. A computer system comprising a processor unit, a display comprising a display screen and a support for a display screen for a computer, the support comprising a bay in which a module may be removably received and a module according to claim 10.

23. A computer system according to claim 22 wherein the module is received in the bay of the support.

24. A computer system comprising a display comprising a display screen and a support for a display screen where the support comprises a rearward portion having inside and outside walls and two arms having inside and outside walls extending forward from the inside wall of said rearward portion toward a first opening, the inside walls of the two arms and the rearward portion forming a bay in which a peripheral module may be removably received through the first opening, wherein a second opening extends all the way between the inside wall of one of the rearward portion and the two walls, and the outside wall of one of the rearward portion and the two walls, a main peripheral module received in the bay and at least one further module connected to the main peripheral module, wherein the main module is connected to a processing unit by a USB connection and wherein the processing unit is connected to the display screen by a video information connection.

* * * * *